United States Patent
Blue et al.

(10) Patent No.: US 11,436,819 B2
(45) Date of Patent: Sep. 6, 2022

(54) CONSOLIDATION AND HISTORY RECORDING OF A PHYSICAL DISPLAY BOARD USING AN ONLINE TASK MANAGEMENT SYSTEM

(71) Applicant: INTERNATIONAL BUSINESS MACHINES CORPORATION, Armonk, NY (US)

(72) Inventors: George Blue, Southampton (GB); Doina L. Klinger, Winchester (GB); Rebecca Quaggin-Mitchell, Botley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 269 days.

(21) Appl. No.: 16/840,500

(22) Filed: Apr. 6, 2020

(65) Prior Publication Data
US 2020/0234087 A1    Jul. 23, 2020

Related U.S. Application Data

(63) Continuation of application No. 15/801,818, filed on Nov. 2, 2017, now Pat. No. 10,650,288.

(51) Int. Cl.
*G06V 10/75* (2022.01)
*G06V 20/62* (2022.01)
(Continued)

(52) U.S. Cl.
CPC ............ *G06V 10/75* (2022.01); *G06V 20/63* (2022.01); *G06Q 10/06313* (2013.01); *G06V 30/10* (2022.01); *G06V 2201/02* (2022.01)

(58) Field of Classification Search
CPC ........ G06V 10/75; G06V 20/63; G06V 30/10; G06V 2201/02; G06Q 10/06313
See application file for complete search history.

(56) References Cited

U.S. PATENT DOCUMENTS

| 8,150,216 B2 | 4/2012 | Retterath et al. |
| 8,340,435 B2 | 12/2012 | Duong et al. |

(Continued)

FOREIGN PATENT DOCUMENTS

WO    2014152997 A2    9/2014

OTHER PUBLICATIONS

Klemmer et al., "Integrating Physical and Digital Interactions on Walls for Fluid Design Collaboration", Human-Computer Interaction, 2008, vol. 23, pp. 138-213, Copyright 2008 Taylot & Francis Group, LLC (Year: 2008).*

(Continued)

*Primary Examiner* — Wesley J Tucker
(74) *Attorney, Agent, or Firm* — Douglas M. Crockatt

(57) ABSTRACT

A method, computer system, and computer program product for consolidating and recording elements on a physical display board is provided. The embodiment may include capturing an initial image of a visual display mechanism, whereby the initial image contains elements. The embodiment may also include determining an initial state of the visual display mechanism based on the captured image. The embodiment may further include recognizing characters of the elements in the initial state. The embodiment may also include capturing a subsequent image of the visual display mechanism, wherein an auditory cue is sent to a user when there is an unsuccessful attempt to capture the subsequent image. The embodiment may further include comparing the initial image and the subsequent image of the visual display mechanism. The embodiment may include identifying (Continued)

updates to the visual display mechanism based on the comparison of the initial image and the subsequent image.

20 Claims, 7 Drawing Sheets

(51) Int. Cl.
*G06Q 10/06* (2012.01)
*G06V 30/10* (2022.01)

(56) References Cited

U.S. PATENT DOCUMENTS

| | | | |
|---|---|---|---|
| 8,819,617 B1 | 8/2014 | Koenig et al. | |
| 9,390,322 B2 | 7/2016 | Wolk et al. | |
| 9,558,467 B1 | 1/2017 | Simon | |
| 2004/0017400 A1 | 1/2004 | Ly et al. | |
| 2008/0225319 A1 | 9/2008 | Takada | |
| 2012/0324372 A1* | 12/2012 | Kowalkiewicz | G06Q 10/103 715/753 |
| 2015/0098649 A1 | 4/2015 | Miyashita | |
| 2015/0106755 A1* | 4/2015 | Moore | G06F 3/04883 715/765 |
| 2015/0347125 A1 | 12/2015 | High et al. | |
| 2016/0034775 A1* | 2/2016 | Meadow | G06V 10/23 382/182 |
| 2019/0130227 A1 | 5/2019 | Blue | |

OTHER PUBLICATIONS

IBM: List of IBM Patents or Patent Applications Treated as Related (Appendix P), May 8, 2020, 2 pages.

Bian et al., "PalimPost: Information Convergence Using Sticky Notes", Proceddings of the Second International Workshop on Web of Things, ACM, 2011, 6 pages.

Dynamic Ventures, Inc. D/B/A computervisionsoftware.com, "Object Recognition Software", https://computervisionsoftware.com/ObjectRecognition.html, printed on Oct. 25, 2017, pp. 1-3.

Elliott, "Capture and share meeting notes with Post-it Plus app", https://www.cnet.com/how-to/capture-and-share-meeting-notes-with-post-it-plus-app/#, Sep. 26, 2014, pp. 1-4.

He et al., "Why Take Notes? Use the Whiteboard Capture System", Microsoft Research Technical Report: MSR-TR-2002-89, Sep. 2002, pp. 1-11.

Klemmer et al., "Integrating Physical and Digital Interactions on Walls for Fluid Design Collaboration", Human-Computer Interaction, 2008, vol. 23, pp. 138-213, Copyright 2008 Taylot & Francis Group, LLC.

Lewis et al., "Evaluating Mobile Remote Presence (MRP) Robots", Group'14, Nov. 9-12, 2014, Sanibel Island, Florida, USA, pp. 302-305.

Mell et al., "The NIST Definition of Cloud Computing," U.S. Department of Commerce, National Institute of Standards and Technology, Sep. 2011, p. 1-7, Special Publication 800-145.

Mural, "Go Beyond the Whiteboard", https://mural.co/, pp. 1-7, printed on Oct. 20, 2017.

Pirarthani et al., "Synchronization of Sticky Notes Using Cloud", 2015 International Conference on Communications and Signal Processing (ICCSP), Apr. 2-4, 2015, Melmaruvathur, India, pp. 1497-1500.

Probst et al., "Move-it Sticky Notes Providing Active Physical Feedback through Motion", 8th International Conference on Tangible, embedded Interaction (TEI'14), TEI'Feb. 16-19, 2014, Munich, Germany, pp. 29-36.

Sinkov, "Evernote Gives Iconic Post-it® Notes a Digital Life", Sep. 26, 2013, https://blog.evernote.com/blog/2013/09/26/evernote-and-post-itr-notes-partner-to-give-your-favorite-paper-product-a-digital-life/, pp. 1-5.

Smith, "An overview of the Tesseract OCR Engine", Ninth International Conference on Document Analysis and Recognition (ICDAR 2007), vol. 2, IEEE, 5 pages.

Trapani, "Instantly Transcribe a Whiteboard with Your Cameraphone", Harvard Business Review, https://hbr.org/2009/08/instantly-transcribe-a-whitebo.html. Aug. 3, 2009, pp. 1-3.

Wikipedia, "Optical character recognition", https://en.wikipedia.org/wiki/Optical_character_recognition, printed Oct. 20, 2017, pp. 1-9.

Wikipedia, "Video content analysis", https://en.wikipedia.org/wiki/Video_content_analysis, printed Oct. 20, 2017, pp. 1-4.

\* cited by examiner

CONSOLIDATION AND HISTORY RECORDING OF A PHYSICAL DISPLAY BOARD USING AN ONLINE TASK MANAGEMENT SYSTEM

BACKGROUND

The present invention relates, generally, to the field of computing, and more particularly to computerized task consolidation.

Computerized task consolidation may relate to the process of generating a list of outstanding tasks for a team to execute. In the field of computing and computer analytics, task consolidation may be performed using computer-based systems which are accessible remotely. Such systems provide reliability and ease of access. However, it is common for teams to meet in person and write tasks on visual display materials, for example, a display board, using sticky notes. These sessions can provide real-time feedback for team members who are present in the room.

SUMMARY

According to one embodiment, a method, computer system, and computer program product for consolidating and recording elements on a physical display board is provided. The embodiment may include capturing an initial image of a visual display mechanism whereby the initial image contains elements. The embodiment may also include determining an initial state of the visual display mechanism based on the captured image. The embodiment may further include recognizing a plurality of characters of the elements in the initial state of the visual display mechanism. The embodiment may also include capturing a subsequent image of the visual display mechanism, wherein an auditory cue is sent to a user when there is an unsuccessful attempt to capture the subsequent image of the visual display mechanism. The embodiment may further include comparing the initial image and the subsequent image of the visual display mechanism. The embodiment may include identifying one or more updates to the visual display mechanism based on the comparison of the initial image and the subsequent image. The embodiment may further include performing a clean-up function of the elements and the plurality of recognized characters associated within the initial state of the visual display mechanism, based on the one or more identified updates.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
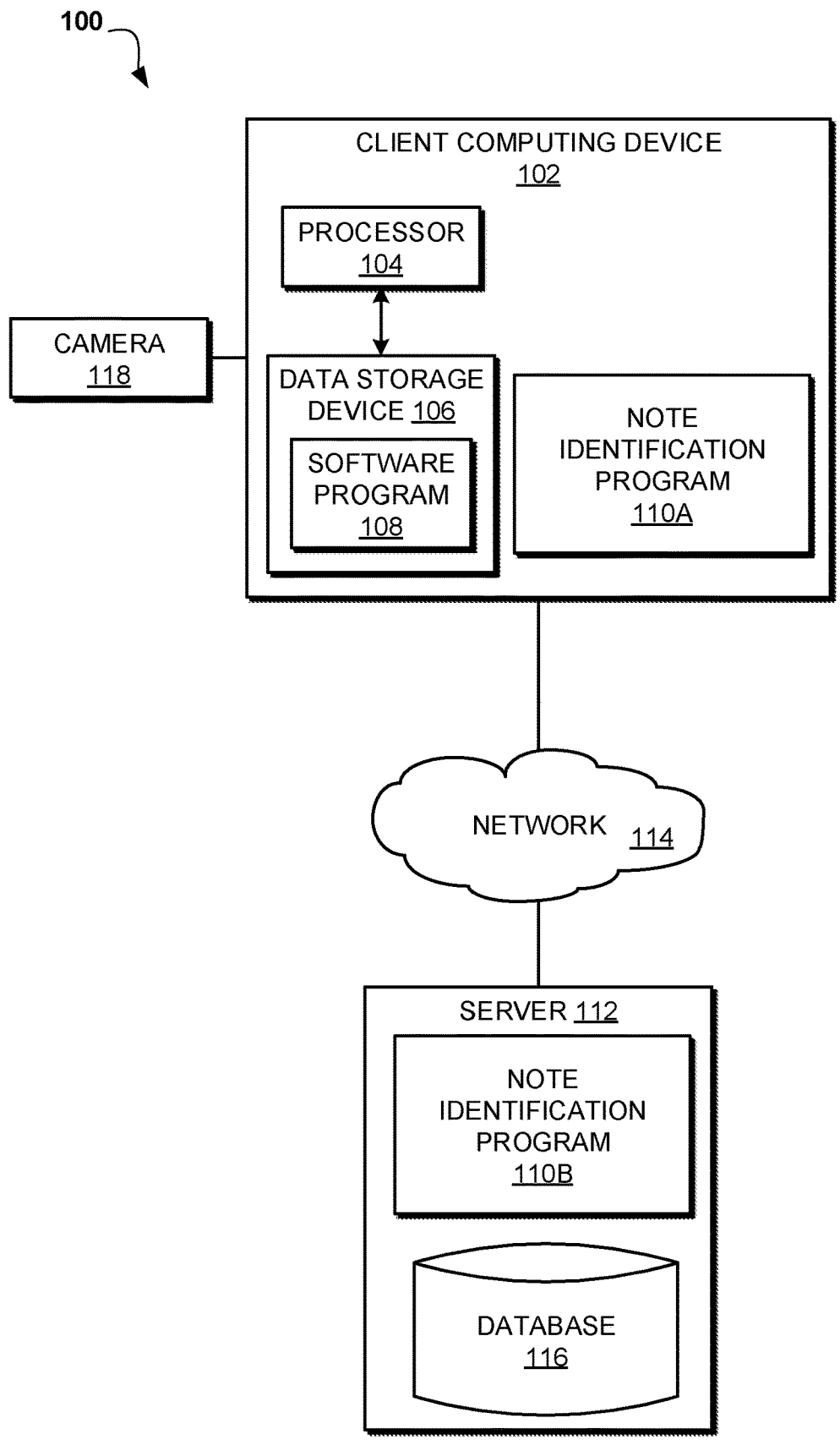
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to computerized task consolidation. The following exemplary embodiments provide a system, method, and program product to, among other things, repeatedly capture note positions on a visual board during a meeting in order to consolidate the captured notes. Therefore, the present embodiment has the capacity to improve the technical field of task consolidation by synchronizing and consolidating tasks created remotely with those created in person during a team meeting. The efficiency of collaboration using remote tools may also be increased as well as enabling features on a physical system which are typically limited to a computerized system such as, the archival and retrieval of notes, remote and in-person team interaction, and automatic calculation of task execution speed. Additionally, the present embodiment may result in more accurate listing and management of tasks for a team.

As previously described, computerized task consolidation may relate to the process of generating a list of outstanding tasks for a team to execute. In the field of computing and computer analytics, task consolidation may be performed using computer-based systems which are accessible remotely. Such systems provide reliability and ease of access. It is common for teams to meet in person and write tasks on visual display materials, for example, a display board, using sticky notes. These sessions can provide real-time feedback for team members who are present in the room.

However, team members who are not present in person (i.e. located remotely) may not be able to hear or see what is discussed in the meeting room. Remote team members may also have difficulty following the progression of tasks during the course of the meeting. As a result, remote team members may duplicate the tasks posted on the visual display mechanism. Therefore, a team member may be required to manually synchronize and consolidate the tasks created in person with those created by remote team members, resulting in potential errors. As such, it may be advantageous to, among other things, digitize notes placed on a physical display board during a meeting, and consolidate the notes created in person with those suggested remotely at the conclusion of the meeting.

According to one embodiment, task consolidation may be achieved using a note identification program and a camera.

The camera may capture notes posted on a visual display mechanism as images. The note identification program may perform optical character recognition (OCR) of the notes, and convert the characters of the notes to machine-encoded text. The captured notes may then be stored in a repository, and updated as the visual display mechanism is continually monitored for changes to the notes, such as positional changes, the addition of new notes, or the deletion of existing notes. The notes may be associated with a number of tasks for team members to execute, for example, building, storing, or creating deliverables. The notes may be synchronized with those suggested by a remote user, by either prompting a live team member to write a sticky note for the remote user, or printing a sticky note and prompting a live team member to place it on the visual display mechanism. Furthermore, the note identification program can recognize that tasks overlap, recognize an association between the overlapping tasks, and create a link in the repository to show that association. Additionally, duplicate notes can be consolidated by comparing notes in the repository to those on the visual display mechanism and prompting the user to remove the duplicate notes from the visual display mechanism. Such a consolidation may result in an accurate task list. The task list can be provided to team members at the conclusion of the meeting, and include a historical listing of changes made to the visual display mechanism during the meeting.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to synchronize and consolidate tasks created remotely with those created in person during a team meeting.

Referring to FIG. 1, an exemplary networked computer environment 100 is depicted, according to at least one embodiment. The networked computer environment 100 may include a camera 118, a client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a note identification program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5 the client computing device 102 may include internal components 1102 and external components 1104, respectively.

The server computer 112 may be a laptop computer, netbook computer, personal computer (PC), a desktop computer, or any programmable electronic device or any network of programmable electronic devices capable of hosting and running a note identification program 110B and a database 116 and communicating with the client computing device 102 via the communication network 114, in accordance with embodiments of the invention. As will be discussed with reference to FIG. 5, the server computer 112 may include internal components 1102 and external components 1104, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The camera 118 may be a device containing audio/visual processing elements capable of capturing, and transmitting images, such as pictures or video, to a computer system. The images can be stored in digital memory, displayed on a screen, and printed on physical media. The camera 118 may be a digital camera, or any current or future devices capable of capturing digital images. The camera may be internally or externally connected to the client computing device 102, or may be a separate device connected to the client computing device 102, through the network 114.

According to the present embodiment, the note identification program 110A, 110B may be a program capable of receiving captured images of a visual display mechanism, using the camera 118, for storage in a repository, such as database 116. The note identification program 110A, 110B may compare initially captured images of the visual display mechanism to subsequently captured images of the visual display mechanism to determine differences in the state of the visual display mechanism. Once comparison of the captured images is complete, the note identification program 110A, 110B may consolidate the captured images based on descriptions and states. The note identification method is explained in further detail below with respect to FIG. 2.

Figure 2:
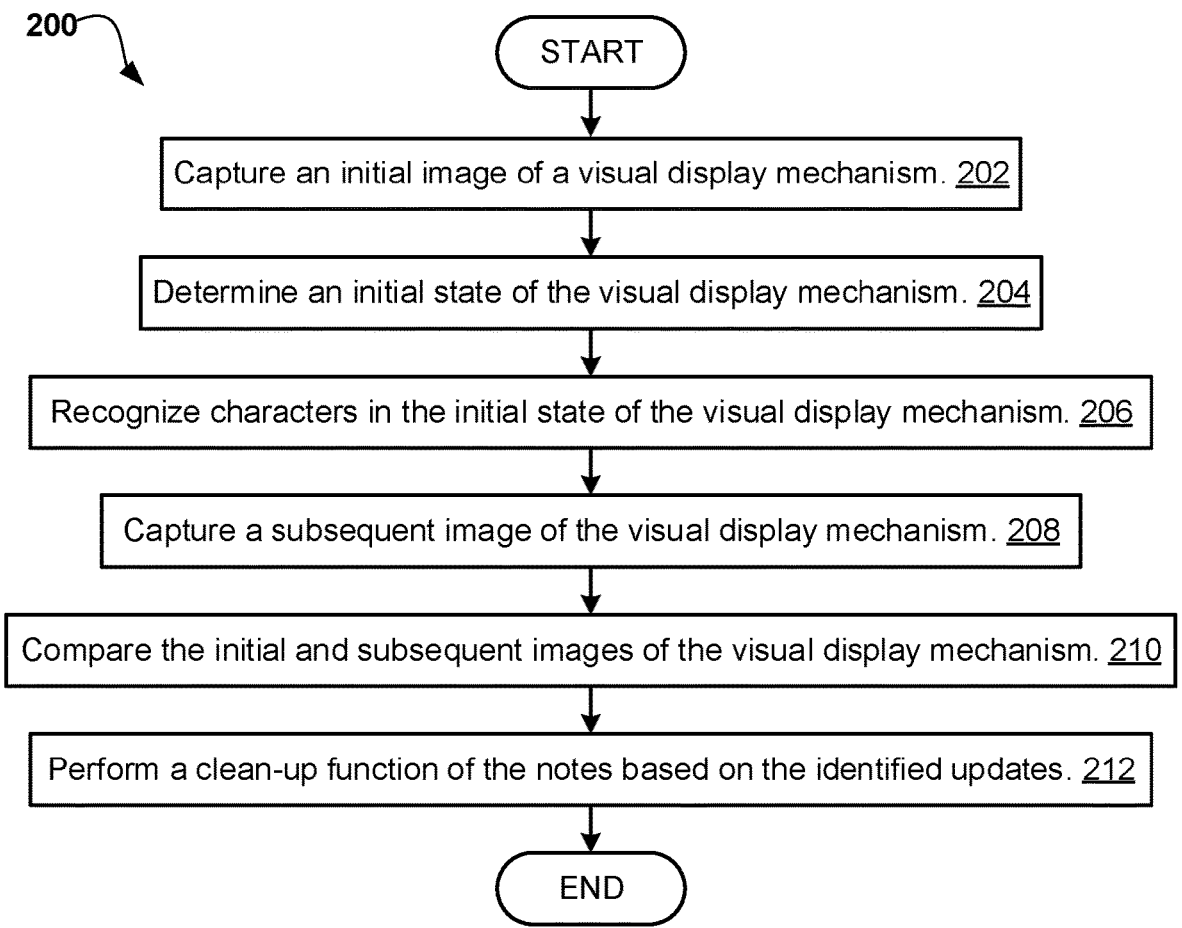
FIG. 2 is an operational flowchart illustrating a note identification process according to at least one embodiment.

FIG. 2 is an operational flowchart illustrating a task synchronization and consolidation process 200, according to at least one embodiment. At 202, the note identification program 110A, 110B uses the camera 118 to capture an initial image of a visual display mechanism. During a team meeting, team members may post elements, such as handwritten task descriptions (e.g., "monitor," "configure," "view") or sticky notes, on a visual display mechanism, for example, a visual display board. The camera 118 may be activated when the meeting begins and aimed at the visual display mechanism. The note identification program 110A, 110B may be configured to capture images of the visual display mechanism in a number of scenarios. For example, the note identification program 110A, 110B may capture an image of the visual display mechanism based on preset time intervals. The note identification program 110A, 110B may also capture an image of the visual display mechanism when the camera 118 detects the movements of a team member in the meeting room. For example, as team members write and post elements on the visual display mechanism, the note identification program 110A, 110B may use the camera 118 to capture a record of the visual display mechanism, such as an image or a video for storage in the database 116. Each element within the captured image or video may be given a unique identifier, which can be used to identify the captured image or video in the database 116. The unique identifier may be a number, such as "123," that identifies the element in subsequent captured images or video for tracking purposes. The unique identifier may be automatically created, using a hashing feature or algorithm. The initially captured image may represent the initial state of the visual display mechanism, which may be used for comparison with subsequent images of the visual display mechanism in order to track changes to the elements of the visual display mechanism.

In at least one embodiment, when the note identification program 110A, 110B fails to capture an image or video of the visual display mechanism, the note identification program 110A, 110B may send an auditory cue to alert team members in the meeting room that there was an unsuccessful attempt to capture an image of the visual display mechanism. For example, the note identification program 110A, 110B may be unable to capture an image of the visual display mechanism if the visual display mechanism is covered with a protective cover or a portion of the visual display mechanism was otherwise obscured. The auditory cue may provide instructional messages for team members, for example, "please remove any obstructions from the visual display mechanism," in order to facilitate proper image capture.

Then, at 204, the note identification program 110A, 110B may determine an initial state of the visual display mechanism. The note identification program 110A, 110B may use image recognition technology to identify the contents of the visual display mechanism. For example, the note identification program 110A, 110B may identify the location of elements, such as sticky notes or handwritten text, on the visual display mechanism. The elements may describe tasks or task states (e.g., started, completed, etc.) on the visual display mechanism.

In at least one embodiment, the recognition of elements on the visual display mechanism may be accomplished by image recognition and similarity matching, affixing bar codes to elements, machine-readable two-dimensional barcodes on the elements, or radio-frequency identification (RFID) chip technology on the elements.

Next, at 206, the note identification program 110A, 110B recognizes characters in the initial state of the visual display mechanism. The note identification program 110A, 110B may identify characters of the elements using optical character recognition (OCR). OCR is the electronic conversion of handwritten or printed text from an image into machine encoded text. The note identification program 110A, 110B can use an OCR function and the camera 118 to scan the elements, and recognize the individual characters written on the elements and the visual display mechanism for further processing. For example, the note identification program 110A, 110B may use OCR to identify the handwritten characters, such as a category header words, on the visual display mechanism, for example "monitor configure view," and convert the category header words to machine-readable text. The note identification program 110A, 110B may also identify two elements, such as sticky notes, and use OCR to identify the characters on the elements, such as "StoryA" and "StoryB." When scanning the images of the visual display mechanism, the state of the tasks may be inferred from their position on the visual display mechanism. For example, tasks may be categorized as backlogged, in progress, or completed.

The OCR function of the note identification program 110A, 110B can convert the recognized text to letters and words based on pattern recognition, resulting in the identification of specific words of the captured note. The note identification program 110A, 110B can process the characters using natural language processing. Natural language processing may relate to computing techniques whereby characters are classified as words. The output may be stored as a number of tasks and descriptions in the database 116. The note identification program 110A, 110B may include relevant information for each task, for example, due date, task owner, date of creation, and a priority level for each task.

In one embodiment, the note identification program 110A, 110B may generate a default title for an element when the note identification program 110A, 110B cannot recognize the title or header characters of an element. For example, the note identification program 110A, 110B may generate a title, e.g. "new task 1234" for an element, such as a sticky note, and prompt the user to update the title for the sticky note.

The note identification program 110A, 110B may determine that specific areas on the board represent specific team members, and may assign tasks in the database 116 to the specific team members. For example, the tasks under the "monitor" description may be assigned to Team Member 1. Such a determination may be made based on prior programming of the note identification program 110A, 110B by a user. Alternatively, such a determination may be made by the note identification program 110A, 110B using specific colors for elements, for example, sticky notes posted on the visual display mechanism. For example, blue sticky notes may be associated with Team Member 1, and red sticky notes may be associated with Team Member 2. Therefore, all tasks related to the blue sticky notes posted on the visual display mechanism may be associated with Team Member 1, and all tasks with red sticky notes posted on the visual display mechanism may be associated with Team Member 2 in the database 116.

Then, at 208, the note identification program 110A, 110B captures a subsequent image of the visual display mechanism. Where specific descriptions or headers (e.g. monitor, configure, view) have been established on the visual display mechanism, the note identification program 110A, 110B may repeatedly scan the visual display mechanism to determine whether any of the captured elements have changed position relative to the descriptions or headers, on the visual display mechanism.

Next, at 210, the note identification program 110A, 110B compares the initial and subsequent images of the visual display mechanism. The note identification program 110A, 110B may repeatedly scan the visual display mechanism during and after a team meeting to identify objects (e.g. sticky notes) posted on the visual display mechanism. The note identification program 110A, 110B may compare the subsequent image captured to the initial capture using image recognition technology. The note identification program 110A, 110B may determine that the difference in location of each element or object represents changes to the state of the visual display mechanism. Further, the identified elements may be compared to previously identified elements stored in the database 116. When an element is removed from the visual display mechanism, the user may be prompted to close any tasks associated with the removed element. Where a remote user suggests a task which does not correspond to an element on the visual display mechanism, the note identification program 110A, 110B may prompt a team member in the meeting room to create a new element for the task. In at least one embodiment, the note identification program 110A, 110B may be capable of generating an element, such as printing a sticky note for the task, and prompting a team member to place the generated element on the visual display mechanism.

The note identification program 110A, 110B may determine a change in element position on the visual display mechanism based on the subsequent image of the visual display mechanism captured at step 208. The note identification program 110A, 110B may track the position of the elements relative to the specific states. The subsequent images of the visual display mechanism may be captured at specific time intervals set by a team member. In an alternate embodiment, the camera 118 may capture an image of the visual display mechanism when the camera 118 detects motion near the visual display mechanism.

In at least one embodiment, the note identification program 110A, 110B may perform a video content analysis to detect temporal and spatial events, that is, the movement of elements on the visual display mechanism. In at least one embodiment, the elements may also be tracked through the visual display mechanism by the unique identifier associated with the element.

In at least one embodiment, the note identification program 110A, 110B may detect that an element has been blocked (i.e. is no longer visible by the camera 118) by the addition of a subsequent element. The note identification program 110A, 110B may analyze previous image captures of the visual display mechanism to identify the task associated with the blocked element. The task may be designated as "blocked" in the database 116. The note identification program 110A, 110B may alert a team member in the room that an element has been blocked, in order for the team member to remove or modify the blocked element. The note identification program 110A, 110B may identify blocked elements in order to prevent team members from duplicating existing tasks on the visual display mechanism.

The note identification program 110A, 110B may determine that an element has been previously matched with a task or state, and is in progress since it was moved to a specific category on the visual display mechanism in a subsequent image capture. For example, Task A may be moved from a "not started" column (column A) to an "in progress" column (column B) because a team member has begun work on the task. The note identification program 110A, 110B may record an updated time stamp for the element to reflect the positional change/status update.

Where an element has not been previously matched with a task stored in the database 116, the note identification program 110A, 110B may create a new task in the database 116 containing the contents of the element. For example, the note identification program 110A, 110B may determine that Task D was written on a sticky note by a team member and placed in the "not started" column (column A). The note identification program 110A, 110B may not recognize this task in the database 116, and create a new record for Task D in the database 116. Additionally, the user may be prompted to accept the creation of a new task for Task D, in order to avoid the creation of duplicate tasks. The determined change in note position is explained in more detail in FIGS. 3A and 3B.

Then, at 212, the note identification program 110A, 110B performs a clean-up function of the elements and associated tasks based on the updates identified at step 212. The note identification program 110A, 110B may categorize the elements based on the changes and current element placements. A number of descriptions (e.g., new, old, pending, etc.), state changes (e.g., movements between board descriptions) and time stamps for the elements can be identified by the note identification program 110A, 110B. For example, Task A may have been moved from column B to column C, since Task A was in progress (column B), and then completed to (column C). The note identification program 110A, 110B may designate Task A as completed in a final task list. The note identification program 110A, 110B may also determine that specific tasks have been removed from the visual display mechanism and delete those tasks from the database 116. For example, if Task B is removed from the visual display mechanism, the note identification program 110A, 110B can remove Task B from the final task list for the meeting.

The note identification program 110A, 110B may determine (as part of the clean-up function) that two elements overlap and consolidate the elements into one. For example, Task A may be "begin coding tasks" and Task B may be "begin tasks for coding." The database 116 may be updated to provide a link referencing such an association between the overlapping elements associated with those tasks.

The note identification program 110A, 110B may also annotate a recording of the team meeting such that a user of the note identification program 110A, 110B may view a portion of the meeting associated with a state change. For example, the annotation of the team meeting may provide a reason as to why sticky note B 304 (shown in FIGS. 3A and 3B) moved from the 'monitor' category to the 'configure' category. The time stamp for the relevant discussion may provide context clues to the user in order to make a determination as to why specific elements were moved on the visual display mechanism.

In one embodiment, the note identification program 110A, 110B may annotate the recording based on user-defined rules for the elements of the visual display mechanism. The user-defined rules may be used to process the elements, and the processed elements may be stored in the data storage device 106. For example, the user-defined rules may include the shape of the elements. The shape of the elements may be related to specific element types, for example, square elements may represent business tasks, and rectangular elements may represent use case stories for a software development team. The note identification program 110A, 110B may update the data storage device 106 based on the user-defined rules as new elements are captured using the camera 118.

At the conclusion of the meeting, note identification program 110A, 110B may provide the user with a consolidated list of elements and associated tasks, as well as a history of the state changes for the elements and tasks. The note identification program 110A, 110B may provide the consolidated list of elements and tasks based on the results of the clean-up function being performed on the elements and tasks.

Figure 3A:
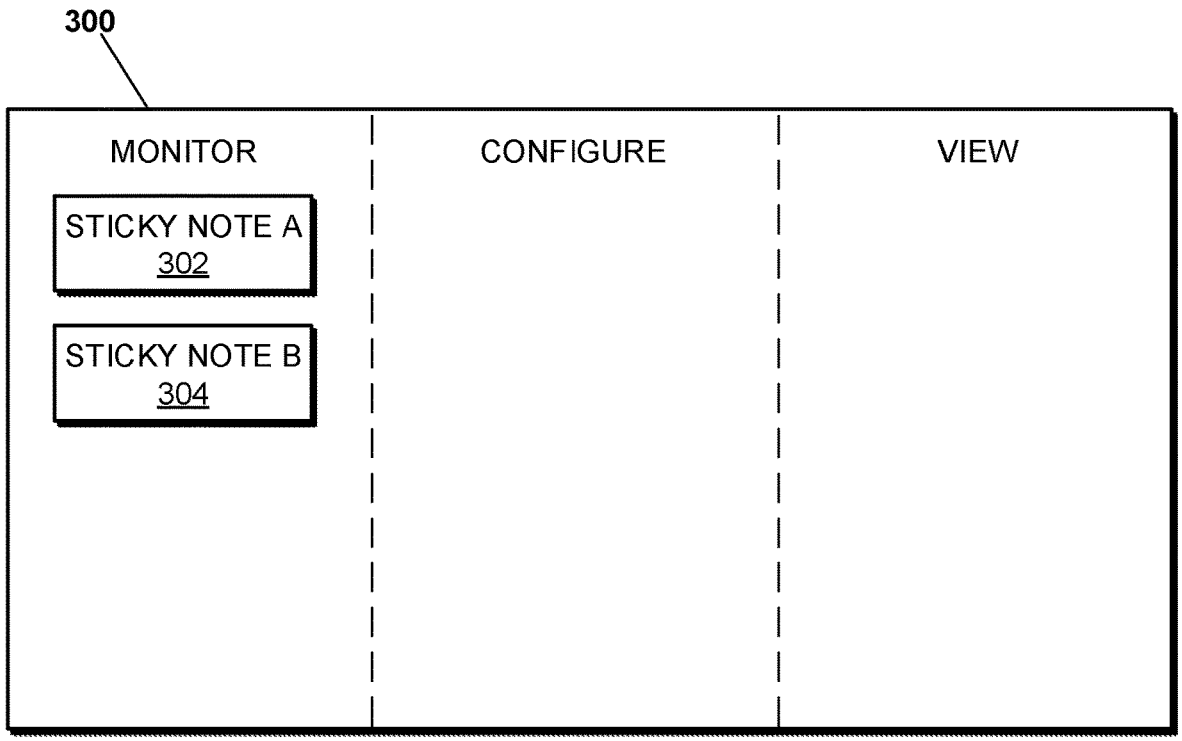
FIGS. 3A and 3B are functional block diagrams of visual display mechanisms according to at least one embodiment.

Referring now to FIG. 3A, a functional block diagram, of a visual display mechanism 300 is depicted according to at least one embodiment. During a team meeting, team members may use a visual display mechanism 300, for example, a visual display board, to list elements, (e.g. tasks) to be executed. The team members may list the tasks in a number of ways, for example, by writing the tasks on the visual display mechanism 300 directly, or as sticky notes posted on the visual display mechanism 300. The team members may list categories such as "monitor," "configure," or "view" to separate the statuses of the tasks. The team members may add, delete, or move the tasks/notes during the meeting, and need to track the changes to the tasks.

The note identification program 110A, 110B may capture an image of the visual display mechanism 300. The note identification program 110A, 110B may determine an initial state of the visual display mechanism 300 prior to the commencement of the meeting. The note identification program 110A, 110B may recognize characters in the initial state of the visual display mechanism 300, using image recognition technology, such as OCR, as previously described. The note identification program 110A, 110B may determine that two elements, such as sticky notes 302 and 304, have been placed in the "monitor" section of the visual display mechanism 300 by a team member who is present in the meeting room.

The note identification program 110A, 110B may create a time stamp and unique identifier for each sticky note 302, and 304, and store both the time stamps, and the unique identifiers in the database 116. The note identification program 110A, 110B may create the time stamp, and the unique identifier for each sticky note 302 and 304, in order to track the sticky notes, and determine changes to the visual display mechanism 300 during the team meeting.

Figure 3B:
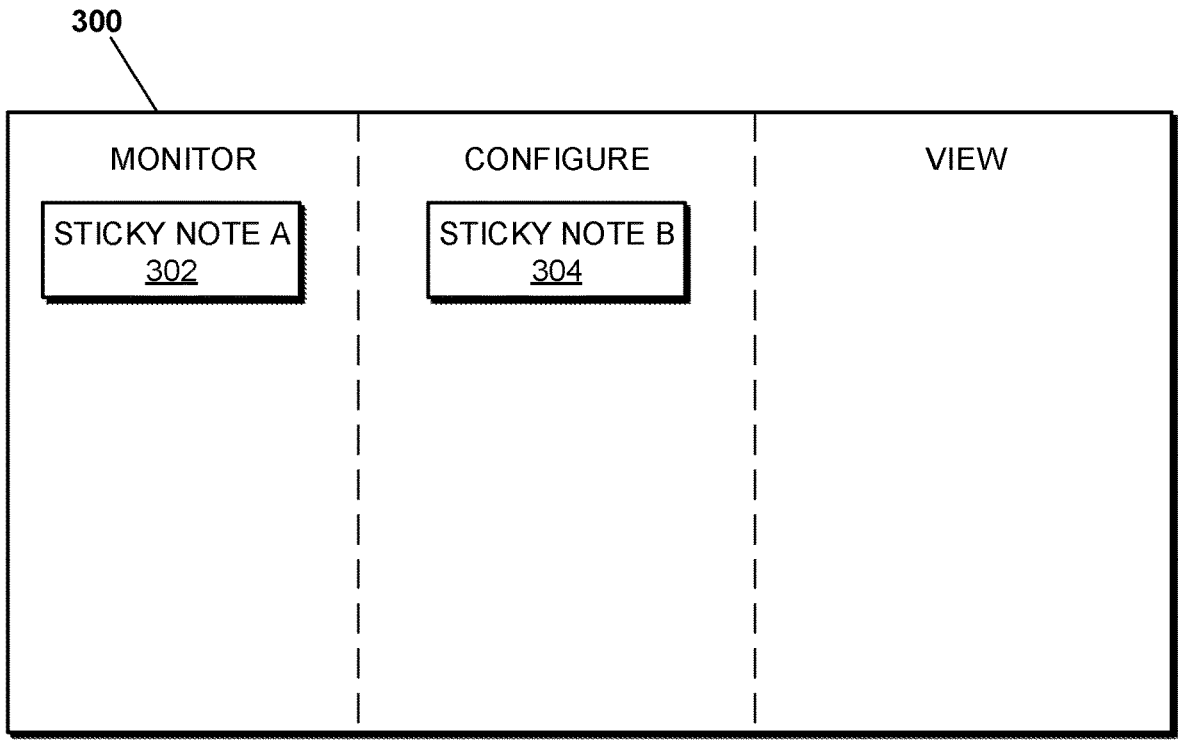

Referring now to FIG. 3B, a functional block diagram of a positional change to elements on a visual display mechanism 300 is depicted according to at least one embodiment. During the team meeting described with reference to FIG. 3A, a team member may place two elements, for example, two sticky notes 302 and 304, on a visual display mechanism 300. The visual display mechanism 300 may be a physical display board, for example, a visual display board. The note identification program 110A, 110B may identify the state of the visual display mechanism 300, and that the two sticky notes 302 and 304 were posted on the visual display mechanism 300.

In the same meeting, the note identification program 110A, 110B may capture a subsequent image of the visual display mechanism 300. The note identification program 110A, 110B may compare the initial and subsequent images of the visual display mechanism 300 in order to determine status updates to the elements (e.g. tasks) on the visual display mechanism 300. For example, the note identification program 110A, 110B may detect (using camera 118) that sticky note A 302 has remained in the "monitor" section of the visual display mechanism 300. The note identification program 110A, 110B may detect that the team member has updated the visual display mechanism 300 by moving sticky note B 304 from the "monitor" section to the "configure" section of the visual display mechanism 300. The note identification program 110A, 110B may create a time stamp for the positional change of the sticky note B 304. The note identification program 110A, 110B may also record a new image location for sticky note B 304. The new image location may be associated with a status update for sticky note B 304, that is, the task associated with the sticky note B 304 has progressed from a "monitor" status to a "configure" status. At the conclusion of the team meeting, the note identification program 110A, 110B may perform a clean-up function of the sticky note 302 and 304 based on the identified updates. As a result of the clean-up function, a final list of tasks may be presented to team members.

Figure 4:
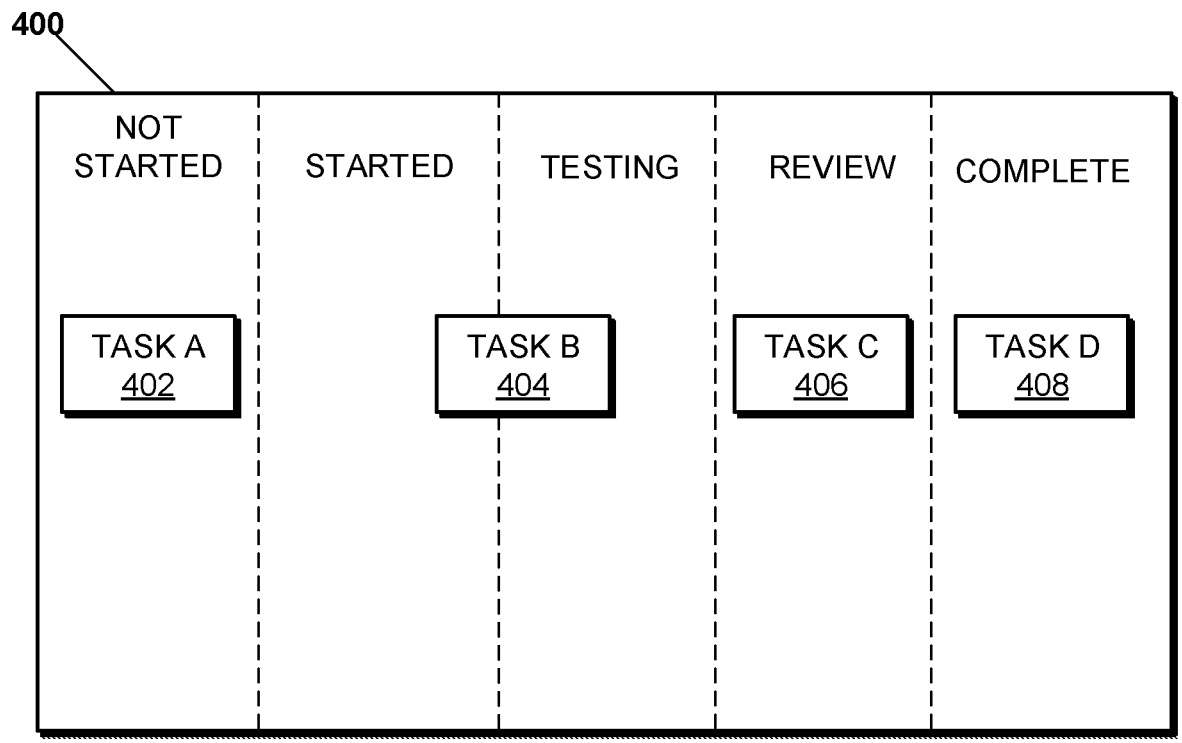
FIG. 4 is a functional block diagram of a visual display mechanism and descriptions of tasks according to at least one embodiment.

Referring now to FIG. 4, a functional block diagram, of elements (descriptions/states and notes) are depicted on a visual display mechanism 400 according to at least one embodiment. During a team meeting, the note identification program 110A, 110B may detect that a number of elements, for example, descriptions have been created on a visual display mechanism 400, the descriptions may include: "not started," "started," "testing," "review," and "complete." The note identification program 110A, 110B may also identify a number of elements, for example, sticky notes 402, 404, 406 and 408 placed on the visual display mechanism 400, and perform OCR on the sticky notes 402, 404, 406 and 408, in order to determine that the sticky notes 402, 404, 406 and 408 represent tasks A 402, task B 404, task C 406, and task D 408. The note identification program 110A, 110B may determine that Task A sticky note 402 is in the "not started" section of the visual display mechanism 400 and is in the unmoved state. The note identification program 110A, 110B may determine that Task B sticky note 404 is between the "started" and "testing" sections of the visual display mechanism 400, and is in the moved state. The note identification program 110A, 110B may also determine that Task C sticky note 406 is in the "review" section of the visual display mechanism 400, and is in the moved state. The note identification program 110A, 110B may determine that Task D sticky note 408 is in the "complete" section of the visual display mechanism 400, and is in the "final" state. At the completion of the team meeting, the note identification program 110A, 110B may annotate the team meeting, and provide the team members with a final list of tasks as well as the history of the elements movement through the descriptions and time stamps for the elements states on the visual display mechanism 400.

It may be appreciated that FIGS. 2-4 provide only an illustration of one implementation and do not imply any limitations with regard to how different embodiments may be implemented. Many modifications to the depicted environments may be made based on design and implementation requirements. More specifically, in at least one embodiment the note identification program may use a movable robotic device to move elements on the visual display mechanism in response to updates to the tasks in the database 116.

Figure 5:
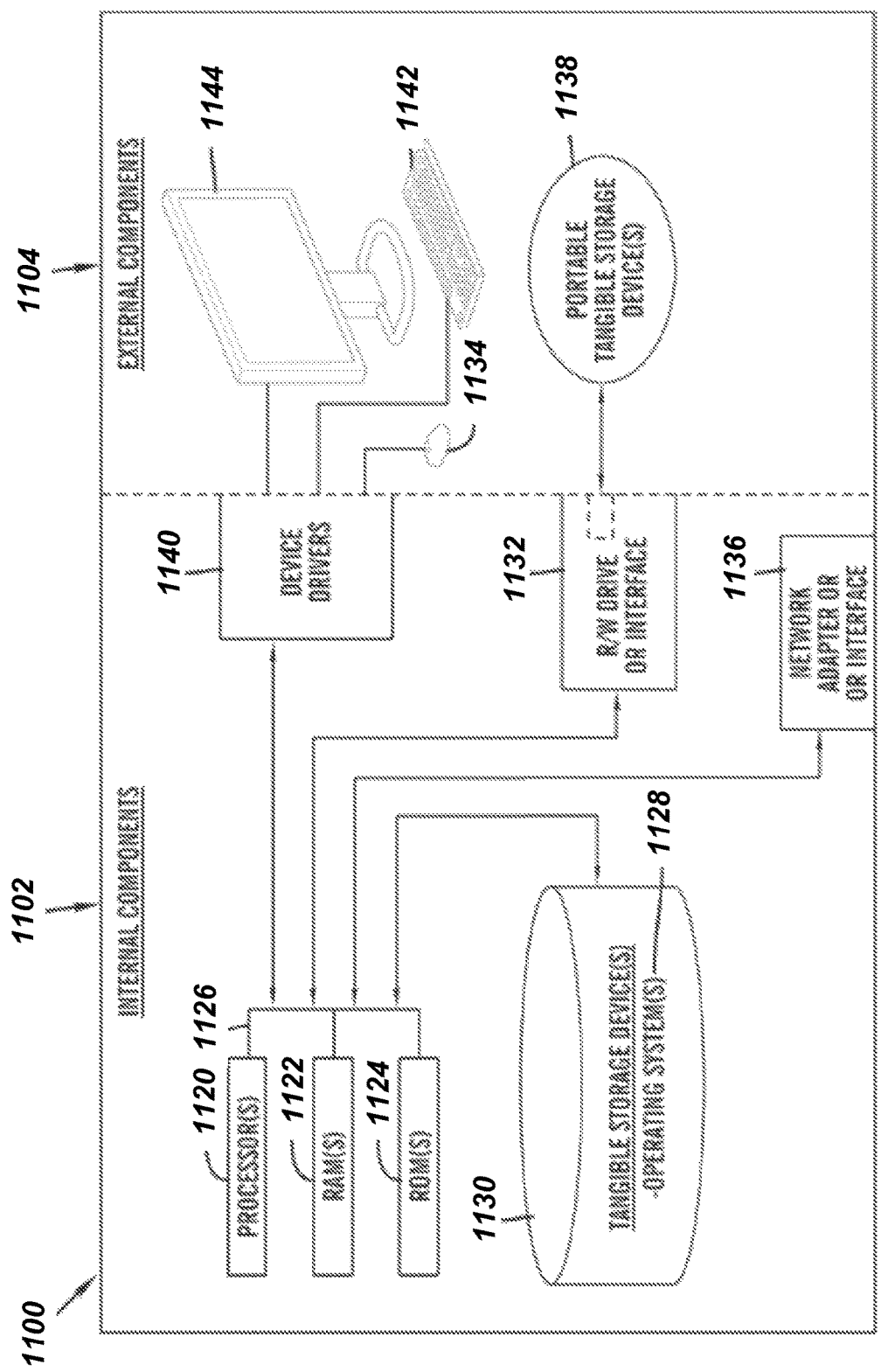
FIG. 5 is a block diagram of internal and external components and servers depicted in FIG. 1, according to at least embodiment.

FIG. 5 is a block diagram 1100 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 1102, 1104 is representative of any electronic device capable of executing machine-readable program instructions. The data processing system 1102, 1104 may be representative of a smart phone, a computer system, PDA, or other electronic devices. Examples of computing systems, environments, and/or configurations that may represented by the data processing system 1102, 1104 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 1102 and external components 1104 illustrated in FIG. 5. Each of the sets of internal components 1102 include one or more processors 1120, one or more computer-readable RAMs 1122, and one or more computer-readable ROMs 1124 on one or more buses 1126, and one or more operating systems 1128 and one or more computer-readable tangible storage devices 1130. The one or more operating systems 1128, the software program 108 and the note identification program 110A in the client computing device 102 and the note identification program 110B in the server 112 are stored on one or more of the respective computer-readable tangible storage devices 1130 for execution by one or more of the respective processors 1120 via one or more of the respective RAMs 1122 (which typically include cache memory). In the embodiment illustrated in FIG. 5, each of the computer-readable tangible storage devices 1130 is a magnetic disk storage device of an internal hard drive. Alternatively, each of the computer-readable tangible storage devices 1130 is a semiconductor storage device such as ROM 1124, EPROM, flash memory or any other computer-readable tangible storage device that can store a computer program and digital information.

Each set of internal components 1102 also includes a R/W drive or interface 1132 to read from and write to one or more portable computer-readable tangible storage devices 1138 such as a CD-ROM, DVD, memory stick, magnetic tape, magnetic disk, optical disk or semiconductor storage device. A software program, such as the note identification program 110A, 110B, can be stored on one or more of the respective portable computer-readable tangible storage devices 1138, read via the respective R/W drive or interface 1132, and loaded into the respective hard drive 1130.

Each set of internal components 1102 also includes network adapters or interfaces 1136 such as a TCP/IP adapter cards, wireless Wi-Fi interface cards, or 3G or 4G wireless interface cards or other wired or wireless communication links. The software program 108 and the note identification program 110A in the client computing device 102 and the note identification program 110B in the server 112 can be downloaded to the client computing device 102 and the server 112 from an external computer via a network (for example, the Internet, a local area network or other, wide area network) and respective network adapters or interfaces 1136. From the network adapters or interfaces 1136, the software program 108 and the note identification program 110A in the client computing device 102 and the note identification program 110B in the server 112 are loaded into the respective hard drive 1130. The network may comprise copper wires, optical fibers, wireless transmission, routers, firewalls, switches, gateway computers and/or edge servers.

Each of the sets of external components 1104 can include a computer display monitor 1144, a keyboard 1142, and a computer mouse 1134. External components 1104 can also include touch screens, virtual keyboards, touch pads, pointing devices, and other human interface devices. Each of the sets of internal components 1102 also includes device drivers 1140 to interface to computer display monitor 1144, keyboard 1142, and computer mouse 1134. The device drivers 1140, R/W drive or interface 1132, and network adapter or interface 1136 comprise hardware and software (stored in storage device 1130 and/or ROM 1124).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
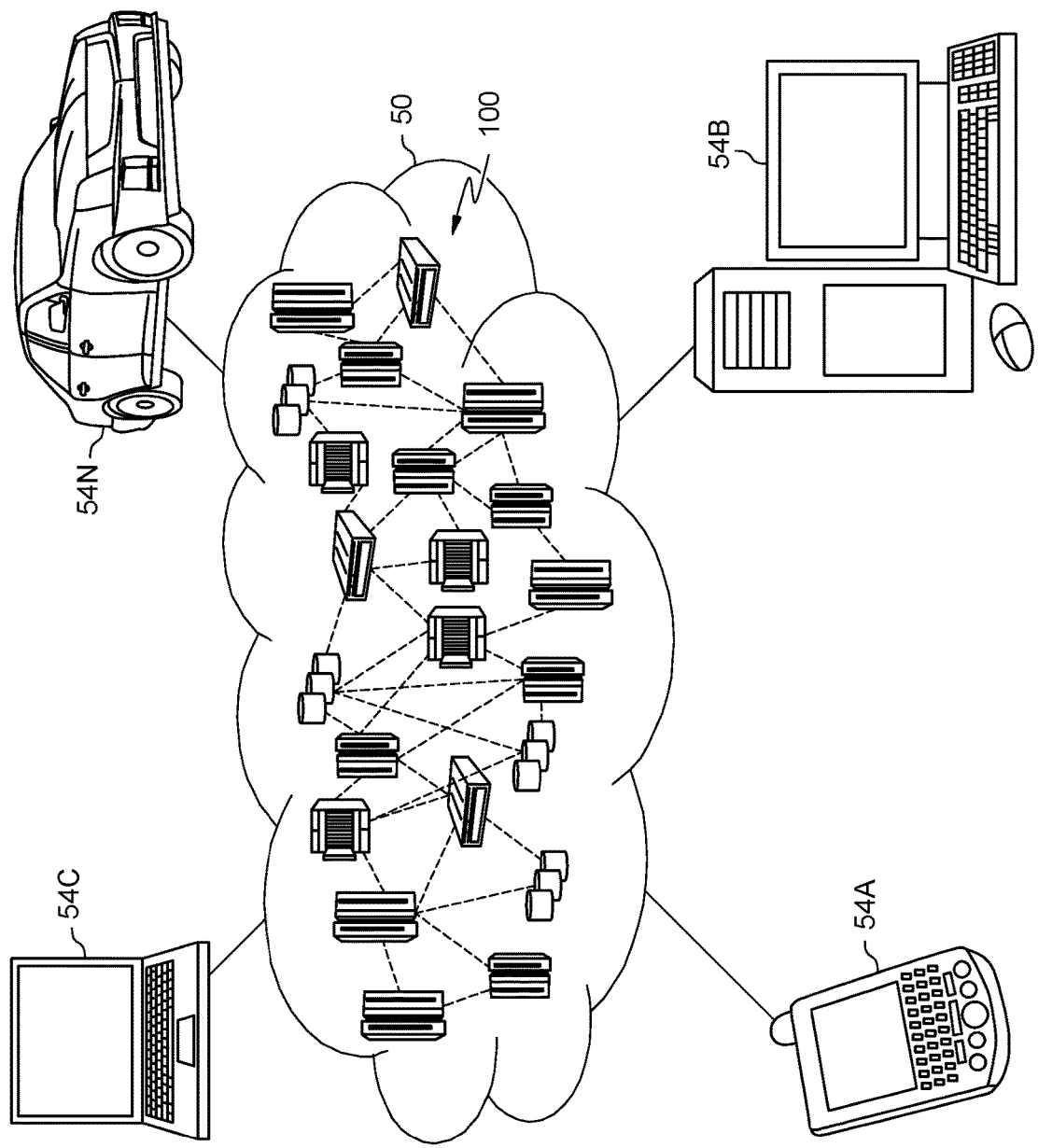
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
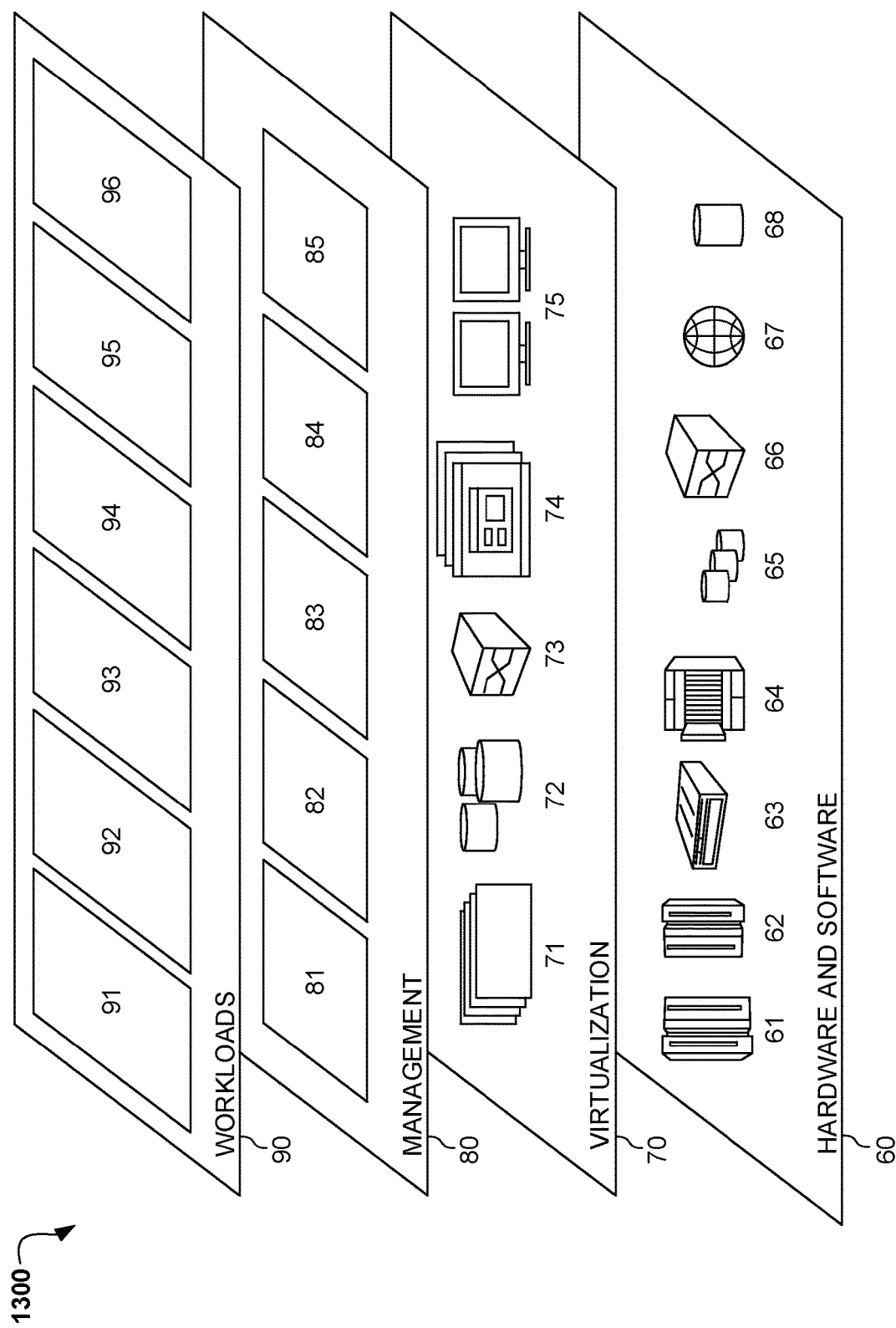
FIG. 7 depicts abstraction model layers according to an embodiment of the present invention.

Referring now to FIG. 7, a set of functional abstraction layers 1300 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and consolidation and recordation of elements of a physical display board 96. Consolidation and recordation of elements of a physical display board 96 may relate to capturing an initial image of a physical display board, identifying the contents of the physical display board, and comparing the initial image to subsequent image captures to determine changes to the contents of the physical display board.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for consolidating and recording elements on a physical display board, the method comprising:
  capturing, by a processor, an initial image of a visual display mechanism, wherein the visual display mechanism contains elements;
  determining an initial state of the visual display mechanism based on the captured initial image;
  recognizing a plurality of characters of the elements in the initial state of the visual display mechanism;
  capturing a subsequent image of the visual display mechanism, wherein an auditory cue is sent to a user when there is an unsuccessful attempt to capture the subsequent image of the visual display mechanism;
  comparing the initial image and the subsequent image of the visual display mechanism;
  identifying one or more updates to the visual display mechanism based on the comparison of the initial image and the subsequent image, wherein one or more updates to the visual display mechanism include determining one or more of the elements has been blocked by one or more subsequent elements; and
  performing a clean-up function of the elements and the plurality of recognized characters associated within the initial state of the visual display mechanism based on the one or more identified updates.

2. The method of claim 1, wherein recognizing the plurality of characters, further comprises:
  identifying the plurality of characters using an optical character recognition function on the elements in the initial state; and
  converting the plurality of recognized characters to letters and words based on a pattern recognition function.

3. The method of claim 1, wherein capturing the subsequent image, further comprises:

performing an image recognition function on the subsequent image, wherein the image recognition function determines the location of the elements of the visual display mechanism.

4. The method of claim 3, wherein identifying one or more updates further comprises:

updating an element of the elements based on a determined change to the location of the element on the visual display mechanism.

5. The method of claim 1, further comprising:

transmitting, to a user, a final list of the elements, wherein the final list of the elements includes a history of updates to the elements, wherein the elements are selected from the group consisting of sticky notes, written headers, descriptions, and task states.

6. The method of claim 1, further comprising:

updating the elements on the visual display mechanism using a robotic device, in response to user feedback received during a recording session.

7. The method of claim 1, further comprising:

sending an alert to a user in response to an unsuccessful attempt to capture an additional image of the visual display mechanism.

8. The method of claim 1, further comprising:

creating an element for placement on the visual display mechanism, in response to a remote user requesting an element creation.

9. A computer system for consolidating and recording elements on a physical display board, the computer system comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

capturing, by a processor, an initial image of a visual display mechanism, wherein the visual display mechanism contains elements;

determining an initial state of the visual display mechanism based on the captured initial image;

recognizing a plurality of characters of the elements in the initial state of the visual display mechanism;

capturing a subsequent image of the visual display mechanism, wherein an auditory cue is sent to a user when there is an unsuccessful attempt to capture the subsequent image of the visual display mechanism;

comparing the initial image and the subsequent image of the visual display mechanism;

identifying one or more updates to the visual display mechanism based on the comparison of the initial image and the subsequent image, wherein the one or more updates to the visual display mechanism include determining one or more of the elements has been blocked by one or more subsequent elements; and performing a clean-up function of the elements and the plurality of recognized characters associated within the initial state of the visual display mechanism based on the one or more identified updates.

10. The computer system of claim 9, wherein recognizing the plurality of characters, further comprises:

identifying the plurality of characters using an optical character recognition function on the elements in the initial state; and converting the plurality of recognized characters to letters and words based on a pattern recognition function.

11. The computer system of claim 9, wherein capturing the subsequent image, further comprises:

performing an image recognition function on the subsequent image, wherein the image recognition function determines the location of the elements of the visual display mechanism.

12. The computer system of claim 11, wherein identifying the one or more updates further comprises:

updating an element of the elements based on a determined change to the location of the element on the visual display mechanism.

13. The computer system of claim 9, further comprising:

transmitting, to a user, a final list of the elements, wherein the final list of the elements includes a history of updates to the elements, wherein the elements are selected from the group consisting of sticky notes, written headers, descriptions, and task states.

14. The computer system of claim 9, further comprising:

updating the elements on the visual display mechanism using a robotic device, in response to user feedback received during a recording session.

15. The computer system of claim 9, further comprising:

sending an alert to a user in response to an unsuccessful attempt to capture an additional image of the visual display mechanism.

16. The computer system of claim 9, further comprising:

creating an element for placement on the visual display mechanism, in response to a remote user requesting an element creation.

17. A computer program product for consolidating and recording elements on a physical display board, the computer program product comprising:

one or more computer-readable tangible storage media and program instructions stored on at least one of the one or more tangible storage media, the program instructions executable by a processor of a computer to perform a method, the method comprising:

capturing, by a processor, an initial image of a visual display mechanism, wherein the visual display mechanism contains elements;

determining an initial state of the visual display mechanism based on the captured initial image;

recognizing a plurality of characters of the elements in the initial state of the visual display mechanism;

capturing a subsequent image of the visual display mechanism, wherein an auditory cue is sent to a user when there is an unsuccessful attempt to capture the subsequent image of the visual display mechanism;

comparing the initial image and the subsequent image of the visual display mechanism;

identifying one or more updates to the visual display mechanism based on the comparison of the initial image and the subsequent image, wherein the one or more updates to the visual display mechanism include determining one or more of the elements has been blocked by one or more subsequent elements; and performing a clean-up function of the elements and the plurality of recognized characters associated within the initial state of the visual display mechanism based on the one or more identified updates.

18. The computer program product of claim 17, wherein recognizing the plurality of characters, further comprises:
  identifying the plurality of characters using an optical character recognition function on the elements in the initial state; and
  converting the plurality of recognized characters to letters and words based on a pattern recognition function.

19. The computer program product of claim 17, wherein capturing the subsequent image further comprises:
  performing an image recognition function on the subsequent image, wherein the image recognition function determines the location of the elements of the visual display mechanism.

20. The computer program product of claim 19, wherein identifying the one or more updates further comprises:
  updating an element of the elements based on a determined change to the location of the element on the visual display mechanism.

\* \* \* \* \*